No. 739,657. Patented September 22, 1903.

UNITED STATES PATENT OFFICE.

ANDREW A. DUNHAM, OF NEW YORK, N. Y., ASSIGNOR TO CASEIN COMPANY OF AMERICA, A CORPORATION OF NEW JERSEY.

SIZING AND PROCESS OF PRODUCING SAME.

SPECIFICATION forming part of Letters Patent No. 739,657, dated September 22, 1903.

Application filed December 29, 1902. Serial No. 137,000. (No specimens.)

*To all whom it may concern:*

Be it known that I, ANDREW A. DUNHAM, a citizen of the United States, residing at New York, in the county of New York and State of New York, have invented or discovered certain new and useful Improvements in Glues or Sizing Compositions and Processes of Producing Same, of which the following is a specification.

It is well known that casein has for many years been used as a substitute for animal glue in sizing paper, &c., and in jointing wood in the manufacture of veneers, &c. To an extent casein is very well adapted for these purposes; but it has some serious disadvantages. It is well known that animal glue after being dissolved and again dried or before it is dissolved softens when heated either by steam or by hot air. This is not true of casein, and owing to that fact it is impossible to utilize it in certain industries—for instance, in the sizing of carpets and also in the sizing of felt, which is used in the manufacture of hats. In these industries it is very essential that after the sizing is dry it should soften when heated.

The object of this invention is to produce a casein composition which has the property of softening or melting when heated by hot air or steam. I have discovered that by adding to the ordinary dry commercial casein a small percentage of animal glue I obtain a product which has the above-named properties. I find, however, that by merely making a mechanical mixture of casein and glue I do not obtain the desired results, owing to the fact that the glue does not dissolve as quickly as does the casein, and therefore a separation takes place while the mixture is being heated with water. To overcome this difficulty, I add to the ordinary dry commercial casein, which is preferaby ground to about forty mesh, a hot solution of animal glue in water. This mixture of dissolved glue and casein is agitated by any suitable means until they are thoroughly mixed. The casein being very hygroscopic readily takes up the hot solution of glue and forms a perfect union. As soon as a perfect mixture is formed it is taken from the mixer and spread on trays and allowed to dry by any suitable means. This mixture while hot is somewhat sticky; but as soon as it has cooled it feels nearly dry, and the lumps which form crumble very easily in the hands, thus making it a very simple matter to handle the mixture.

In carrying out this process I prefer to use the following proportions, although I do not limit myself to these proportions, as they may be varied without materially affecting the product: To five hundred parts of finely-ground ordinary commercial casein I add fifty parts of animal glue dissolved in two hundred parts of water. (By "animal glue" I mean the ordinary bone, hide, or fish glue which are commonly on the market.) By this process I am able to produce a product which has the appearance of casein, and the glue is not at all noticeable, owing to the fact that it is entirely absorbed by the particles of casein. I find that this product has many advantages over either casein or glue as a sizing and when heated softens sufficiently for the sizing of felts and carpets.

Having thus described my invention or discovery, what I claim, and desire to secure by Letters Patent, is—

1. A glue or sizing composition, in dry marketable condition, consisting of granular or broken casein combined with about ten per cent. of animal glue which has been thoroughly incorporated with or absorbed by the particles thereof, substantially as set forth.

2. The herein-described process for producing a glue or sizing composition, consisting in mixing a solution of animal glue with dry granular or broken casein, stirring the mixture until the glue solution becomes thoroughly incorporated with or absorbed by the casein, and finally drying the mixture, substantially as set forth.

3. The herein-described process for producing a glue or sizing composition, consisting in mixing a hot solution of animal glue with dry granular or broken casein, stirring the mixture until the glue solution becomes thoroughly incorporated with or absorbed by the casein, and finally drying the mixture, substantially as set forth.

In testimony whereof I affix my signature in presence of two witnesses.

ANDREW A. DUNHAM.

Witnesses:
L. H. BARNETT,
A. L. ST. JOHNS.